(12) United States Patent
You et al.

(10) Patent No.: US 7,407,580 B2
(45) Date of Patent: Aug. 5, 2008

(54) SYSTEM AND METHOD FOR TREATING CARBON, NITROGEN, PHOSPHOROUS CONTAINING WASTEWATER

(75) Inventors: Huey-Song You, Yilan (TW); Kuan-Foo Chang, Changhua (TW); Sheng-Shin Chang, Miaoli (TW); Shwu-Huey Perng, Hsinchu (TW); Shu-Kang Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/476,071

(22) Filed: Jun. 28, 2006

(65) Prior Publication Data

US 2007/0193949 A1    Aug. 23, 2007

(30) Foreign Application Priority Data

Feb. 17, 2006    (TW) .............................. 95105354 A

(51) Int. Cl.
    *C02F 3/30*    (2006.01)
(52) U.S. Cl. ...................... 210/605; 210/617; 210/259; 210/903; 210/906
(58) Field of Classification Search ................ 210/603, 210/605, 615–617, 630, 252, 259, 903, 906, 210/908

See application file for complete search history.

(56) References Cited

U.S. PATENT DOCUMENTS

| 5,342,522 | A | * | 8/1994 | Marsman et al. ............ 210/605 |
| 6,406,629 | B1 | | 6/2002 | Husain et al. |
| 6,485,645 | B1 | | 11/2002 | Husain et al. |
| 6,692,642 | B2 | * | 2/2004 | Josse et al. .................. 210/605 |

* cited by examiner

Primary Examiner—Fred Prince
(74) Attorney, Agent, or Firm—Bacon & Thomas PLLC

(57) ABSTRACT

The present invention relates to a wastewater treating system and method for removing pollutants of carbon, nitrogen, phosphorous, comprising: a first reactor contains methanogenic bacteria, PAO and denitrifying bacteria for eliminating the organic carbon in denitrification by denitrifying bacteria, adsorbing partial organic carbon and releasing phosphate by PAO and; metabolizing organic carbon to form methane gas by methanogenic bacteria; a second reactor disposed at the rearward of first reactor, second reactor treats the effluent from first reactor by denitrifying bacteria and PAO, denitrifying bacteria is able to denitrifying the nitrate and PAO is able to process the phosphorous releasing; a third reactor disposed rearward of second reactor, which comprises PAO, heterotrophic bacteria and nitrifying bacteria, wherein PAO is applied for phosphorous accumulating process, the heterotrophic bacteria is applied for carbon removal process, the nitrifying bacteria is applied for nitrifying process; and a membrane separation reactor disposed inside or rear of third reactor to separate various microorganisms and the treated effluent. The present invention applies methanogenic bacteria in the system for decreasing the amount of waste sludge efficiently and reduce power consuming.

17 Claims, 10 Drawing Sheets

SYSTEM AND METHOD FOR TREATING CARBON, NITROGEN, PHOSPHOROUS CONTAINING WASTEWATER

BACKGROUND OF THE INVENTION

1. Field of the Invention

The present invention relates to a novel wastewater treating system for removing carbon, nitrogen and phosphorous and the method thereof. More particularly, to apply methanogenic bacteria in the wastewater treating system, which is able to lower the production volume of the residual sludge and decrease the problem of power consuming.

2. Description of Related Art

The design of early wastewater treatment system usually comprises with the purpose of decreasing the organic pollution, which prevents the pollutants flow into water and consumes the oxygen of the water due to the organism decomposed by the microorganism and causes the decreasing of the dissolved oxygen in the water then affects the living of the aquatic creature. However, the domestic wastewater includes not only the organisms but it also includes abundant nitrogen, phosphorous, theses compounds are the essential nutrients for the growth of various algae. In the proper temperature and enough sunshine, the abundant nitrogen and phosphorous will make the aquatic algae grow, and causes another damage of the water.

The traditional domestic wastewater usually treats with the active sludge process. It is mainly in the purpose of removing the carbon in the wastewater. Generally it is able to remove 5~15% phosphorous at the primary treatment (mainly combine with the solid objects). It is able to remove about 10~25% phosphorous with traditional biological treating method and transforms ammonia nitrogen into nitrate nitrogen by the nitrifying microorganisms, however, it is still limited in the removing ability to whole nitrogen and phosphorous nutrients. Currently, there had been a strict discharging standard of nitrogen and phosphorous nutrients in the domestic wastewater. Taiwan had already made the effluent standard of total concentration of nitrogen in 15 mg/L, total concentration of phosphorous in 2 mg/L of excluding the wastewater into the protective area of water source, quality and volume in the public sewers. However, in order to maintain the aquatic ecology balance effectively and prevent the problem of eutrophication on water body on the earth surface. Moreover, according to the popularity of the development of public sewers in our country, it is necessary to control the discharging of nitrogen, phosphorous nutrients.

The domestic wastewater exists in the form of ammonia nitrogen and organic nitrogen, no matter that it is treated in aerobic or anaerobic biological treating method; the organic nitrogen is easy to be metabolized into ammonia nitrogen. The traditional nitrogen removal process is to apply with the microorganism in the aerobic condition. It oxidizes ammonia nitrogen into nitrate-nitrogen, then in the anaerobic condition, to reduce the nitrate-nitrogen into nitrogen gas and spread into the water in order to achieve the purpose of nitrogen removal.

The phosphorous compound is able to remove in the following methods: (1) chemical precipitation: it is obtained the precipitation by adding ions such as, Ca, Fe and Al ions and controlling the pH value, (2) the phosphorous assimilation of microorganism, (3) the microorganism accumulates phosphate, (4) the enhanced chemical precipitation of microorganism control, wherein the microorganism accumulates method of phosphorous removal is widely applied in recent year. Phosphorous is saved in the form of polyphosphate granular objects in the cell, it is considered to be the cell energy and the source of phosphorous. In the wastewater treating system, there is a special microorganism called Phosphate Accumulating Organism (PAO). It releases phosphorous in the anaerobic condition, however it will accumulate large volume of phosphate in the water in the aerobic condition, which is over the physical require. PAO gains the energy by decomposing the polyphosphate salt in the bacteria in the condition of non-dissolved oxygen and non-combining oxygen. It processes absorption of low molecule fatty acid such as acetic acid (from facultative bacteria hydrolysis product or exist in the wastewater already) and synthesizes poly-β-hydroxybutyrate (PHB) to save in the cell. Polyphosphate granular object is decomposed and release phosphorous into the wastewater. In the aerobic condition, PAO is treating oxygen as an electron acceptor and aerobic decomposes the PHB in the bacteria or external carbon for producing the energy. Apply the energy for absorbing the phosphate in the wastewater and then transforming into polyphosphate in the bacteria in order to remove the exceeded sludge for achieving the purpose of removing phosphate in the wastewater.

In order to achieve removing nitrogen and phosphate in the same time in one wastewater treating system, basically, a wastewater treating system has to comprise three different oxidation states, (Anaerobic-Anoxic-Oxide Activated Sludge Process, $A_2O$) (show as in FIG. 1). It is usually used for treating the wastewater includes organic carbon, phosphorous and nitrogen in order to make the wastewater pass through the biological treating process of anaerobic, anoxic and aerobic for achieving the effect of nitrogen removal and phosphorous removal at the same time. The microorganism of $A_2O$ treating process is nitrifying bacteria, denitrifying bacteria, PAO and the heterotrophic bacteria of lowering the chemical oxygen demand (COD). In the anaerobic reactor, when denitrifying bacteria and PAO are processing the phosphorous and nitrogen removal, it is necessary to provide organic carbon for metabolism, and the organic compound left from the phosphorous and nitrogen removal process of denitrifying bacteria and PAO decomposes in the aerobic reactor by the heterotrophic bacteria. The aerobic reactor provides a place for nitrifying of ammonia nitrogen and the mineralization of the organic compound; therefore, the traditional $A_2O$ treating process is able to produce large volume of residual sludge in the normal operation. If the process is designed or operated improperly, it is easy to cause the shortage of nitrifying bacteria and the failure of nitrogen removal. Zenon company combine the membrane filtering technology and the $A_2O$ treating process, it solves the problem of losing nitrifying bacteria. Although, it solves the problem of losing nitrifying bacteria but causes a large volume of sludge and causes large power consuming, therefore, it still cannot overcome the problem of the deficiency in nitrogen removal.

The Taiwan patent application number 92132719 disclosures an organic-pollutant-included wastewater treating system, comprising an anaerobic bioreactor, aerobic bioreactor and a membrane separation reactor; wherein the aerobic bioreactor is disposed rearward of the anaerobic bioreactor, the membrane separation reactor is disposed rearward of the aerobic bioreactor, the system is capable of eliminating organic pollutants in wastewater by using a biological processing method, and separating solid substances from the liquid ones by using a membrane. The organic-pollutant-included wastewater treating system is able to remove the organic pollutants effectively and solve the problem of the scaling and the fouling on the surface of membrane. However, the objects in the wastewater comprise not only organic pollutants but also carbon, nitrogen and phosphorous, therefore, to develop a wastewater treating system which is able to remove carbon, nitrogen and phosphorous in the same time and improve the problem of causing a large volume of sludge and power consuming of the traditional wastewater system (for example, $A_2O$), it is truly a fine subject for research.

Therefore, it is desirable to provide an improved speech recognition method to mitigate and/or obviate the aforementioned problems.

SUMMARY OF THE INVENTION

The wastewater treating system of prior art requests high chemical oxygen demand (COD) in the process of phosphorous and nitrogen removal, and it increases the loading of the aerobic bioreactor, which is leading the increasing of power consuming and the big volume of residual sludge. Therefore the present invention provides a system and a method for removing carbon, nitrogen and phosphorous in the wastewater. The object of the present invention is to provide a wastewater treating system, which is having the functions of microorganism methylation, phosphorous removal and denitrifying, replace the most function of the aerobic heterophic bacteria in the traditional $A_2O$ system with methanogenic bacteria for making the aerobic reactor (the third reactor) as a location for the nitrifying of ammonia nitrogen, which is able to decrease the power consuming and lower the volume of residual sludge.

To achieve the object, the present invention provides a water treatment system for removing pollutants of carbon, nitrogen, phosphorous, comprising: a first reactor, which contains methanogenic bacteria, PAO and denitrifying bacteria for the reactions of eliminating organic carbon in denitrification by denitrifying bacteria, adsorbing partial organic carbon and releasing phosphate by PAO and; metabolizing organic carbon to form methane by methanogenic bacteria; a second reactor disposed at the rearward of said first reactor, said second reactor treats the effluent from said first reactor by denitrifying bacteria and PAO, said denitrifying bacteria is able to denitrifying the nitrate and the PAO is able to release the phosphate; a third reactor disposed at the rearward of said second reactor, which comprises PAO, heterotrophic bacteria and nitrifying bacteria, wherein said PAO is applied for phosphorous accumulation process, said heterotrophic bacteria is applied for carbon removal process, said nitrifying bacteria is applied for nitrifying process; and a membrane separation reactor disposed inside said third reactor or the rearward of said third reactor in order to separate a plurality of microorganisms and the treated effluent.

In one embodiment of the present invention, the membrane is disposed in the third reactor, the mix solution of the third reactor is capable of recycling to the first reactor and/or the second reactor.

In another embodiment of the present invention, the membrane is disposed at the rearward of the third reactor, it is capable of providing a fourth reactor for mounting said membrane. In the present embodiment, the mix solution of the fourth reactor is capable of recycling to the first reactor and/or the second reactor for treating, the mix solution of the third reactor is capable of recycling to the second reactor.

Preferablely, the first reactor is sludge bed-type, the second reactor and the third reactor are complete mixing-type. If the denitrifying bacteria of the first reactor comprise insufficient organic carbon volume in the process of denitrification, and it is able to conduct partial raw wastewater directly into the second reactor.

In one preferred embodiment, the membrane is capable of washing by gas, wherein the gas comprises biogas or air. The biogas comprises nitrogen, methane, carbon dioxide, and hydrogen. Applying washing membrane with the biogas is able to lower the pH value to 0.2~1.0 unit for further preventing the causing of the scaling.

The present invention also provides a method, which applies with the water treatment system for removing pollutants of carbon, nitrogen, phosphorous comprising the steps as follow: (a) conducting the wastewater into the first reactor for making the methanogenic bacteria processing a organic compound methylation, the denitrifying bacteria for decomposing the organic pollutants and nitrate nitrogen, in the meantime, the function of Phosphate Accumulating Organism is to attach the organic compound for processing the phosphorus releasing; (b) conducting the effluent of the first reactor into the second reactor, making the denitrifying bacteria and PAO to treat the effluent of the first reactor, the function of the denitrifying bacteria is to denitrify the nitrate and the function of PAO is to attach the organic compound for releasing the phosphate; (c) conducting the effluent of the second reactor into the third reactor, the third reactor includes PAO, heterotrophic bacteria and nitrifying bacteria, wherein said PAO is applied for phosphorous accumulation process, said heterotrophic bacteria is applied for carbon removal process, said nitrifying bacteria is applied for nitrifying process; and (d) conducting the effluent of said third reactor into a membrane, separate various microorganisms and the treated effluent by the membrane, in the meantime, achieving the purpose of removing the phosphorus by the sludge wasting mechanism.

In one embodiment of the present invention, the membrane is mounted in the third reactor, the mix solution of the third reactor is capable of recycling to the first reactor and/or said second reactor.

In another embodiment of the present invention, the membrane is disposed at the rearward of the third reactor, it is capable of providing a fourth reactor for mounting the membrane. In the present embodiment, the mixed solution of the fourth reactor is capable of recycling to the first reactor and/or the second reactor, the mix solution of the third reactor is capable of recycling to the second reactor.

The present invention also provides a method for removing pollutants of carbon, nitrogen, phosphorous in the wastewater, comprising: applying the methanogenic bacteria, denitrifying bacteria, nitrifying bacteria, heterotrophic bacteria and PAO for processing the function of phosphorous and nitrogen removal and the removing of the organism; wherein the functions of said methanogenic bacteria in the process of phosphorous and nitrogen removal of denitrifying bacteria, nitrifying bacteria and PAO is to metabolize the organic carbon for methylation, and also it is able to achieve the function of methylation, phosphorous removal, nitrifying and denitrifying of microorganisms.

The present invention provides a wastewater treating system and method for removing carbon, nitrogen and phosphorous in the wastewater, which is improved from prior arts. It applies with adding methanogenic bacteria for making the organic carbon, which is produced by denitrifying bacteria, nitrifying bacteria and PAO processing the methylation, it is able to make the aerobic reactor as a location for processing the nitrifying of ammonia nitrogen for decreasing the power consuming, lower the volume of each reactors and volume of residual sludge.

Other objects, advantages, and novel features of the invention will become more apparent from the following detailed description when taken in conjunction with the accompanying drawings.

DETAILED DESCRIPTION OF THE PREFERRED EMBODIMENT

The wastewater treatment system and method for removing pollutants of carbon, nitrogen, phosphorous of the present invention improve the traditional $A_2O$ treating process, which is adding methylation in the phosphorous and nitrogen removal, it is also developed a multi-functional reactor, which is provided with the functions of methylation, phosphorous removal, nitrifying and denitrifying of microorganisms, which means replacing aerobic heterophic bacteria with methanogenic bacteria. Processing the methylation for the most left organism from the phosphorous and nitrogen removal metabolism, the aerobic reactor is used as a location for ammonia nitrogen nitrifying in order to decrease the power consuming and lower the volume of residual sludge.

Figure 1:
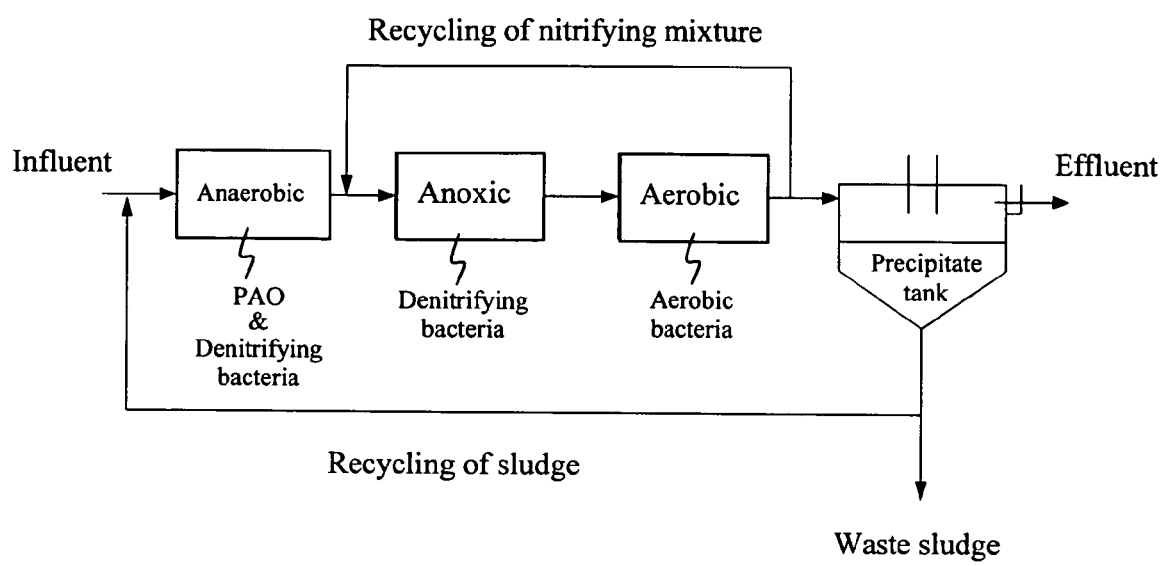
FIG. 1 is a traditional $A_2O$ wastewater treating system.
Figure 2:
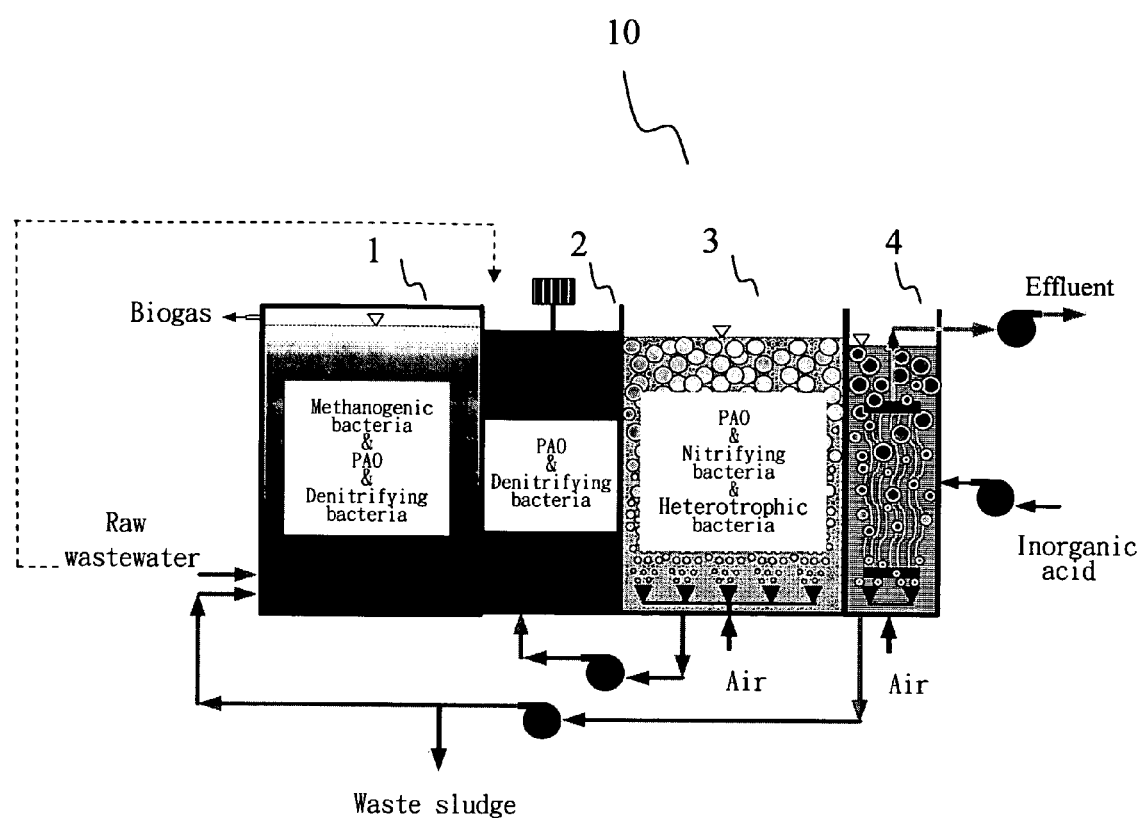
FIG. 2 is an embodiment of the wastewater treating system of the present invention.

More clearly, one of the embodiment of the wastewater treatment system 10 for removing pollutants of carbon, nitrogen, and phosphorous of the present invention, as shown in FIG. 2, comprising a multi-functional bioreactor 1 (first reactor) which comprises methanogenic bacteria, PAO and denitrifying bacteria for processing the following reactions in the reactor: the denitrifying of the denitrifying bacteria, in the meantime removing partial organic carbon, PAO adsorbing with partial organic carbon then releasing phosphate and methanogen metabolizing organic carbon then occurring gas methane; an anoxic reactor 2 (second reactor), which is disposed rearward at the multi-functional bioreactor 1, treating the effluent of the first reactor 1 by denitrifying bacteria and PAO, the PAO attach some part of organic carbon and release phosphate, the denitrifying of the denitrifying bacteria also removes the partial carbon in the same time; an aerobic reactor 3 (third reactor), which is disposed at the rearward of the anoxic reactor 2, process the aerobic metabolizing of the organic carbon attached at the multi-functional reactor 1, the nitrifying bacteria transfers ammonia nitrogen into nitrate nitrogen then treats with other aerobic microorganism for removing the residual organic pollutants from the effluent of the anoxic reactor 2; and a membrane separation reactor 4, which is disposed at the rearward of the aerobic reactor 3 for separating a plurality of microorganisms and the treated effluents.

The denitrifying bacterium of the multi-functional bioreactor 1 is able to transfer $NO_3^-$ into $N_2$ of the wastewater in the anaerobic state, the PAO is able to process the phosphorous releasing, and the processing method formula is shown as follow:

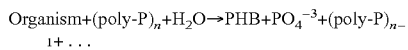

$$\text{Organism} + (\text{poly-P})_n + H_2O \rightarrow PHB + PO_4^{-3} + (\text{poly-P})_{n-1} + \ldots$$

The denitrifying and phosphorous releasing process make the rising of phosphate and the lowering of the nitrate in the multi-functional reactor 1, and the left organic carbon of denitrifying and phosphorous process and the ammonia nitrogen comprised in the water are able to remove by the process of carbon removing metabolizing and the nitrifying by aerobic heterotrophic bacteria and nitrifying bacteria in the aerobic reactor 3. If the carbon comprising volume is too high, it lowers the nitrifying effect of the aerobic reactor 3; therefore, it needs to increase the methylation function of the methanogenic bacteria in the multi-functional reactor 1 for lowering the carbon comprising volume in the water. The main function of the aerobic reactor 3 is to provide ammonia nitrogen nitrifying and is not necessary to consume extra power to treat the residual organic carbon for decreasing the power consuming and decreasing the volume of residual sludge.

The flow-in water of the multi-functional reactor 1 includes the recycling water of the membrane separating reactor 4. The purpose of recycling is to recycle the microorganism; therefore, the multi-functional reactor 1 does not have to dispose a solid-liquid-gas three-phased separation device. The reactor of the multi-functional reactor 1 is airtight sludge bed-type, wherein the main functional bacterium comprises the methanogenic bacteria, which is able to produce methane by the metabolizing process, the PAO of processing phosphorous releasing and the denitrifying bacteria of processing denitrifying (which metabolizes the $N_2$ which is produced by organisms and the nitrate), the main product biogas here includes $CH_4$, $N_2$ and $CO_2$.

The flow-in water of anoxic reactor 2 comprises the effluent from multi-functional bioreactor 1 and recycling mixture from aerobic reactor 3, the purpose of backflow is to recycle the nitrate for processing the denitrifying. The reactor of the anoxic reactor 2 is complete mixing-type mechanical stir reactor, the main function bacteria comprises PAO for phosphorous releasing and the denitrifying bacteria for denitrifying.

The flow-in water of aerobic reactor 3 is the effluent of the anoxic reactor 2, the rector of aerobic reactor 3 is complete mixing-type aeration reactor. The main function bacteria of the reactor 3 comprise the phosphorous accumulation of PAO, the nitrifying of nitrifying bacteria and the carbon removing of the aerobic heterotrophic bacteria.

A wastewater treatment system for removing pollutants of carbon, nitrogen, phosphorous of the present invention comprises phosphorous releasing process in the anaerobic environment, it is comprises with the phosphorous accumulating process in the aerobic environment; the methanogenic bacteria needs to process methylation in the state of absolutely anaerobic (without nitrate), it is not able to process the methylation in the state of aerobic environment (or with nitrate).

In one embodiment of the water treatment system for removing pollutants of carbon, nitrogen, phosphorous of the present invention, at the beginning of the sludge seeding, the multi-functional bioreactor 1 and the aerobic reactor 3 seed respectively with anaerobic sludge and aerobic sludge, wherein the membrane separation reactor 4 is able to comprise a device of recycling the microorganisms into the multi-functional reactor 1 and anoxic reactor 2.

The main by-product of the anaerobic biology metabolism is $CO_2$, it is able to increase the concentration of carbonate in the system, if it is comprises Ca, Mg, Fe or other heavy metal in the water, it is easy to form a carbonate metal scaling on the surface of the membrane to conduct the membrane fouling. After the effluent of the anoxic reactor 2 of the present invention flow into the aerobic rector 3, the aerobic microorganism is able to remove the residual organic pollutants and the air stripping after the aeration is able to raise the pH value of the water up about 1-2 units for making the dissolved metal ion of the effluent of the anaerobic reactor 1 to form carbonate metal crystal in the high pH value; the carbonate metal crystal is mounted into the floc of the aerobic microorganism by bioflocculation of the aerobic microorganism, and lower the possibility of forming a scaling on the membrane of membrane separation reactor 4. When the effluent of the aerobic reactor 3 flows into the membrane separation reactor 4, it is able to wash by biogas, which lower the pH value in the water about 0.2-1.0 units and further prevent the carbonate metal scaling occurring in the high pH value system; therefore, if in needed, it is capable of washing with air then cooperating with inorganic acid (ex. HCl) to lower the pH value of the membrane separation reactor 4 in order to prevent the scaling.

The advantages of the present invention are further depicted in the illustration of examples, but the descriptions made in the examples should not be construed as a limitation on the actual application of the present invention.

EXAMPLE

Example 1

Figure 3:
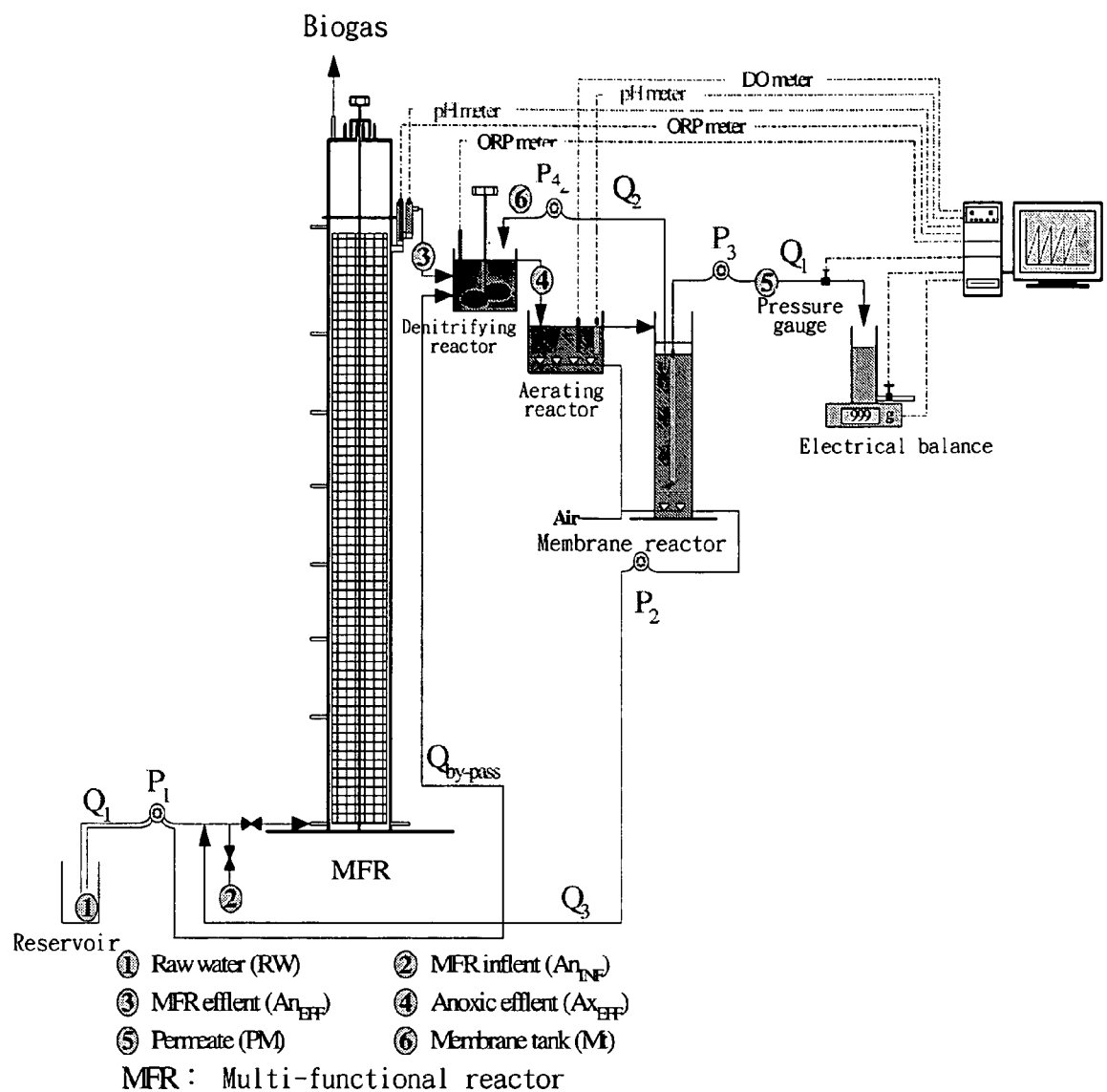
FIG. 3 is illustrated the wastewater treating system of the example 1 of the present invention.

Removing the Carbon, Nitrogen and Phosphorous Contained Pollutants from the Wastewater with the System of the Present Invention The wastewater treating system of the present example is shown as FIG. 3, each reactor corresponds to FIG. 2, wherein that the denitrifying reactor is anoxic reactor, the aerating reactor is aerobic reactor. The microorganism seeding of the present example is to implant the granular methanogenic microorganism in the multi-functional reactor; and seed suspended (non granular) denitrifying bacteria, PAO, nitrifying bacteria and general carbon removing bacteria in the denitrifying reactor, aerating reactor and the membrane reactor.

The flowing state in the multi-functional reactor is sludge bed-type (incomplete mixing type), complete mixing—type in the denitrifying reactor, the aerating reactor and the membrane reactor. The system operating method includes: (1) obtain the original wastewater (synthesized wastewater) with Q1 (flowing volume) by P1 (peristalsis pump) and obtain the backflow of the membrane reactor with Q3 by P2, mixing the two strands together and flowing into the multi-functional bioreactor; (2) the effluent of multi-functional reactor flow into the denitrifying reactor in the gravity method; (3) there are three strands of influents in denitrifying reactor, which are the effluent of the multi-functional reactor, the recycling water of the membrane reactor, which is in Q2 by P4 and $Q_{by\text{-}o\text{-}pass}$ (To start according to the need, it is started when the insufficient of carbon source occurs in the denitrifying process of the denitrifying bacteria); (4) the aerating reactor and the membrane reactor are connected together, the influent is the effluent of the denitrifying reactor, the effluent flows pass the membrane and discharges in Q1 by P3.

In the aspect of the system detection and control, the multi-functional reactor is provided with ORP and pH value measure detector; the denitrifying reactor is provided with ORP measure detector; the aerating reactor and the membrane reactor are provided with DO and pH value measure detector, the effluent of the membrane is detected by the micro pressure gauge and the electrical balance.

The multi-functional bioreactor is designed in plug flow, the microorganism is distributed in sludge bed, the multi-functional bioreactor is not only able to save bigger volume of microorganism, but also the concentration of the microorganism in the reactor provides in the distribution of higher in bottom and lower in top, when the wastewater enters from the bottom, the microorganism is capable of removing the oxidized objects rapidly for making the environment reduced to benefit in the processing of methylation, and because the multi-functional reactor is designed in the sludge bed model, which is provided with filtration property, the organic particles of the wastewater is easy to be filtered, which is able to enhance the function of removing organism.

The synthesized wastewater is composed by glucose, acetic acid (carbon source), ammonium chloride and potassium di-hydrogen phosphate. The system is operated continuously and detects the pH value and the ORP value of the denitrifying reactor and the multi-functional reactor, and also detects the DO value, pH value and the ORP value of the aerating reactor in the same time.

Figure 4:
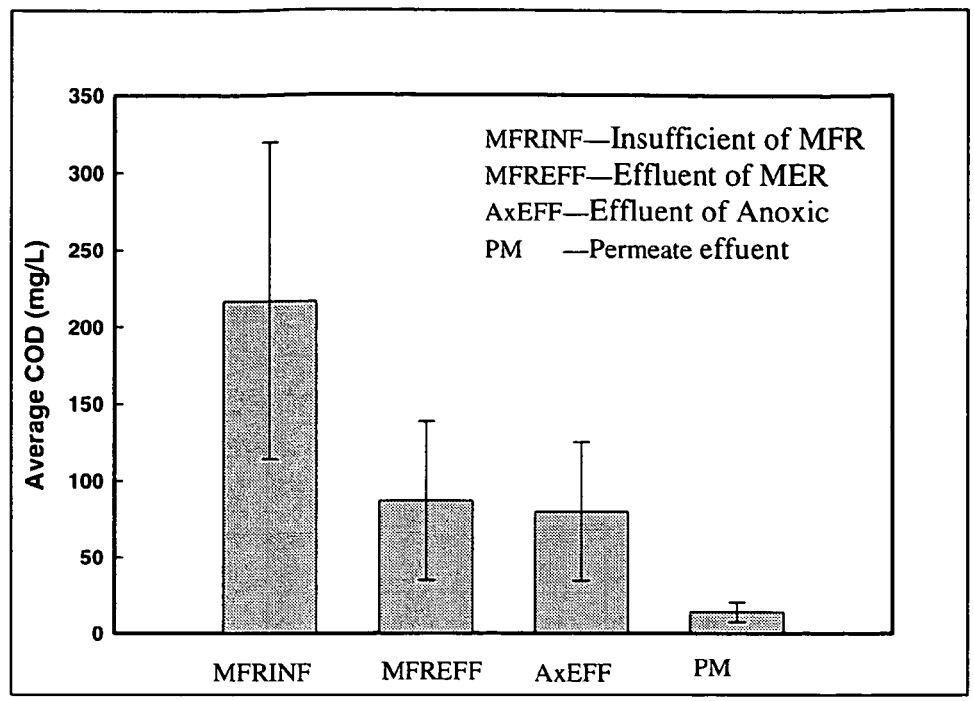
FIG. 4 is the variation of the average COD concentration of each reactor of the example 1 of the present invention.

After two-monthed primary function analysis, the COD value of the influent wastewater from the multi-functional reactor is about 200 mg/L, the result is as shown in FIG. 4, and FIG. 4 is the COD concentration of the influent of the multi-functional bioreactor (includes the original wastewater and the recycled water), the effluent of the denitrifying reactor (anoxic reactor) and the effluent of the membrane reactor. The COD concentration of the effluent of the multi-functional bioreactor is between 90~100 mg/L, the effluent of the membrane reactor, which the COD concentration of permeate is about 10~20 mg/L, the result shows that the water treating system for removing pollutants of carbon, nitrogen, phosphorous of the present invention is operated well, and the methanogenic bacteria in the reactor lowers the COD effectively for decreasing the loading of the aerobic bacteria in the aerating reactor.

Figure 5:
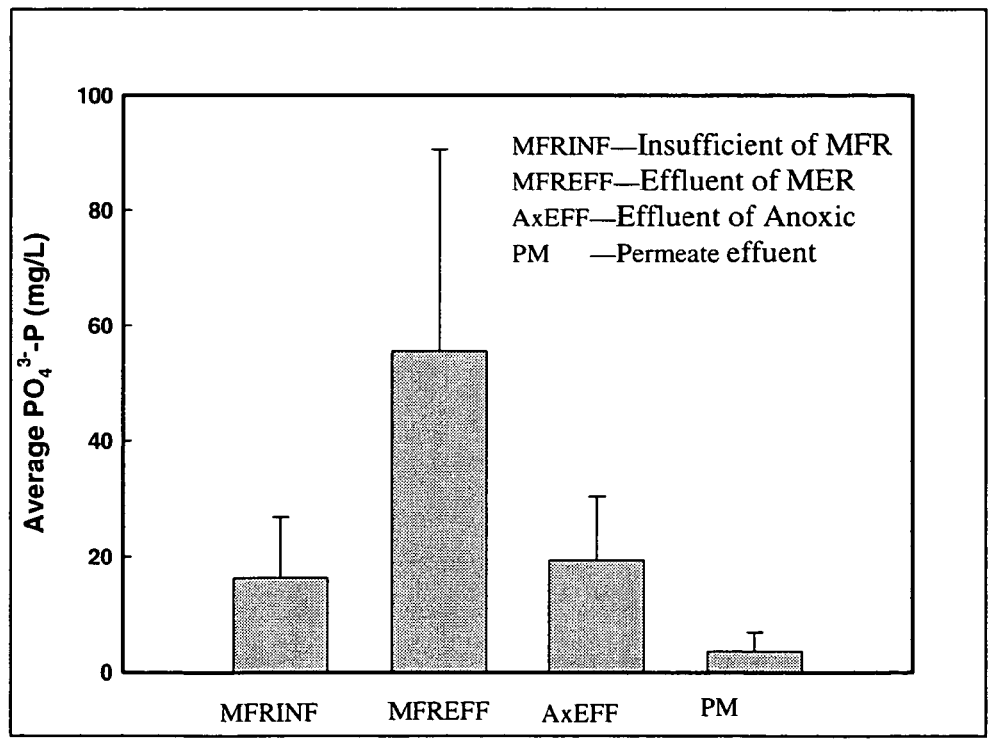
FIG. 5 is the variation of the average phosphorous concentration of each reactor of the example 1 of the present invention.
Figure 6:
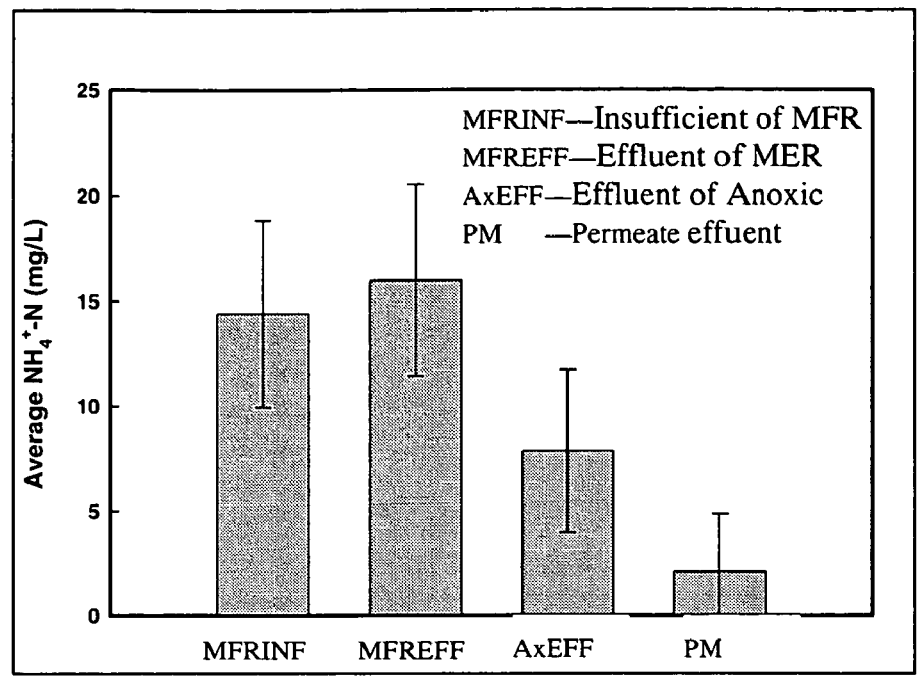
FIG. 6 is the variation of the average ammonia nitrogen concentration of each reactor of the example 1 of the present invention.
Figure 7:
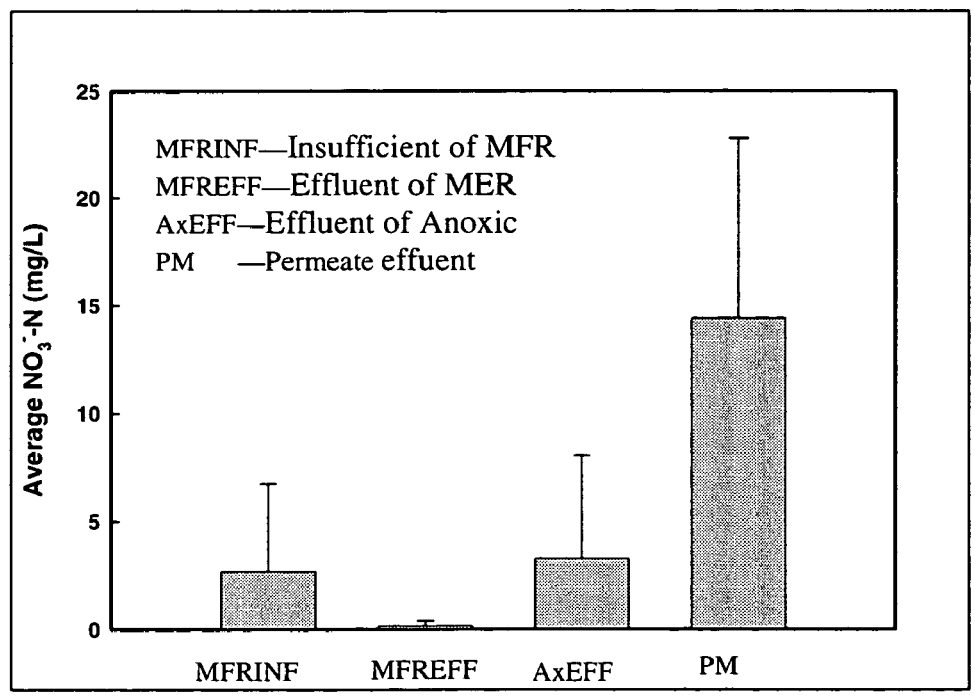
FIG. 7 is the variation of the average nitrate-nitrogen concentration of each reactor of the example 1 of the present invention.

To make sure the treating statement of the microorganism in the multi-functional reactor, denitrifying reactor and the aerating reactor, processing regular examinations in phosphorous concentration, ammonia nitrogen concentration and the nitrate nitrogen concentration of the influent of multi-functional reactor, the effluent of multi-functional reactor, the effluent of denitrifying reactor and the effluent of the membrane reactor, the result is as shown in FIGS. 5, 6, 7. According to FIG. 5, the multi-functional reactor provides with higher phosphorous concentration shows that the mainly processes in the multi-functional reactor is the phosphorous releasing. According to FIG. 6, the nitrate concentration of the effluent from the denitrifying reactor is lower because of the function of denitrifying; according to FIG. 7, the concentration of nitrate nitrogen of the effluent from the membrane reactor is increased, which means the nitrifying bacteria of the aerating reactor is provided with real nitrifying, which means the oxygen volume of the aerating reactor is able to satisfy the aerobic metabolism.

Figure 8:
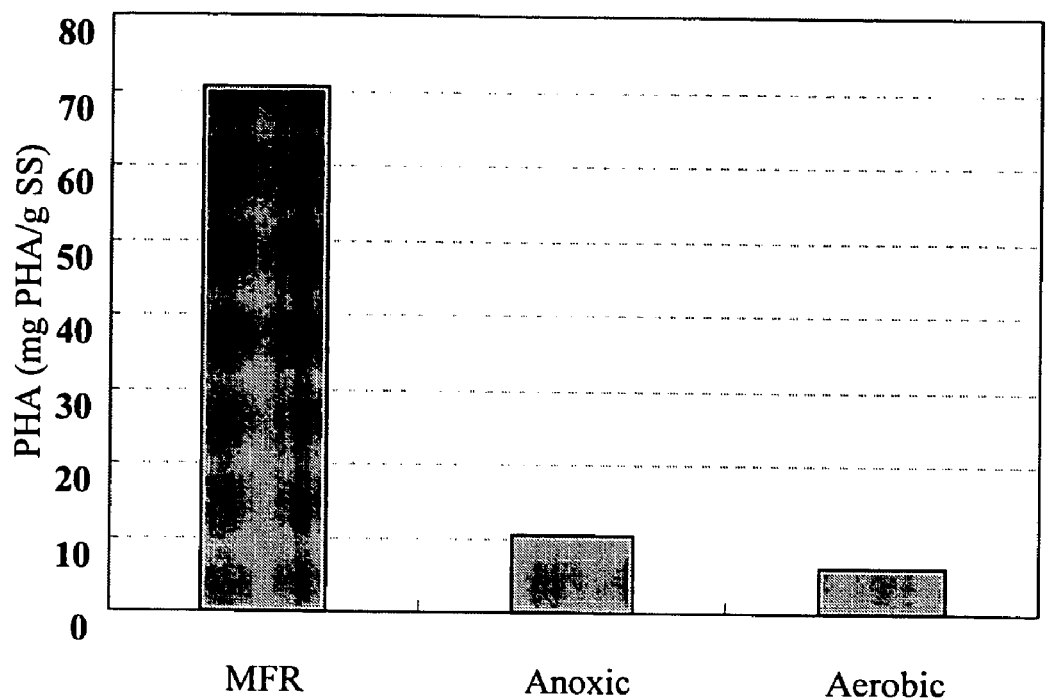
FIG. 8 is the variation of the average PHA in the microorganism of each reactor of the example 1 of the present invention.

The variation of PHA (Poly Hydroxy Acid) volume of multi-functional reactor, denitrifying reactor (anoxic reactor) and the aerating reactor (aerobic reactor) of FIG. 8 is able to estimate the function of PAO in each reactor. In the anaerobic environment, the PHA synthesis of PAO is from two major reactions, first, the glycolysis, the main purpose is to produce enough reduction energy. Second, absorbing the short chain fatty acid for synthesizing PHA then saving in the body and also consuming the reduction energy. Absorbing different short chain fatty acid will form with different PHA. In the anaerobic area; PAO breaks the bonding of the poly phosphate for producing energy and absorb the short chain fatty acid for synthesizing PHA then saving in the cell, the PAO in the aerobic area metabolizes the saving PHA and also accumulated more phosphate for obtaining energy.

Figure 9:
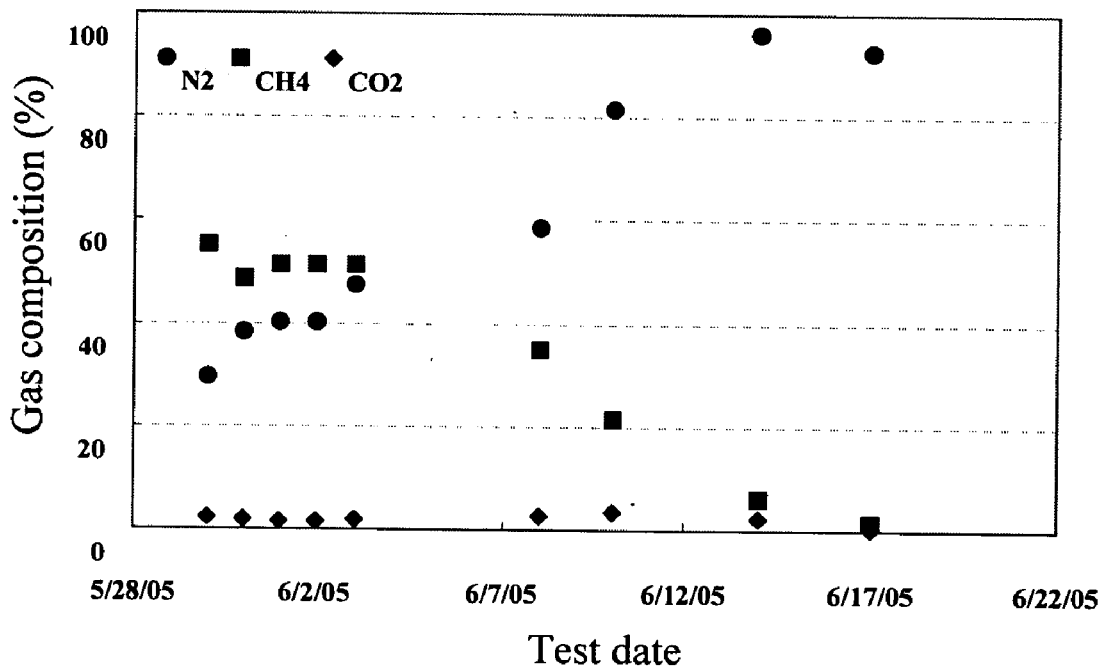
FIG. 9 is the variation of the gas composition of the multi-functional reactor of the example 1 of the present invention.

According to FIG. 9 of the present example, the gas composition of the multi-functional reactor comprises the increasing nitrogen and the decreasing methane gas, it is kept the low concentration of $CO_2$. It shows that the biogas of the water treatment system for removing pollutants of carbon, nitrogen, phosphorous of the present invention comprises the methane gas decreasing by the metabolism of the methanotrophic bacteria, and the nitrogen gas is increased in the process of nitrogen removal in the wastewater treating system.

Figure 11:
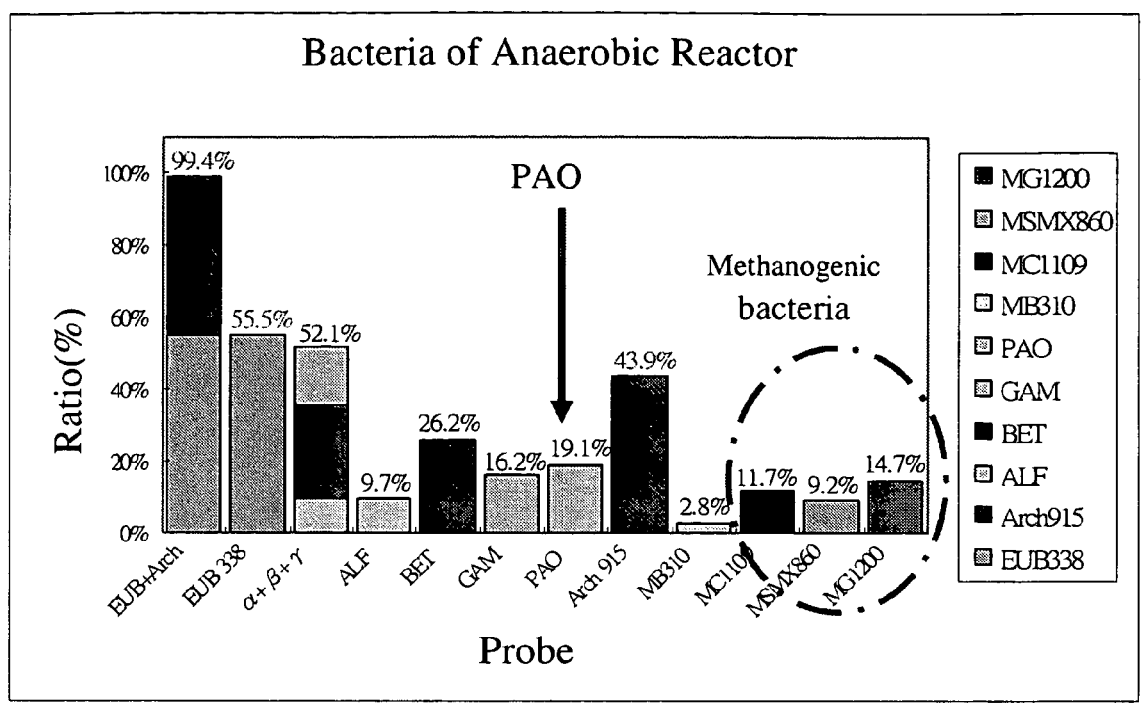
FIG. 11 is the bacteria result of the multi-functional reactor, which is analyzed by the molecular biology technology method (Fluorescence in situ Hybridization, FISH) in the example 2.
Figure 12:
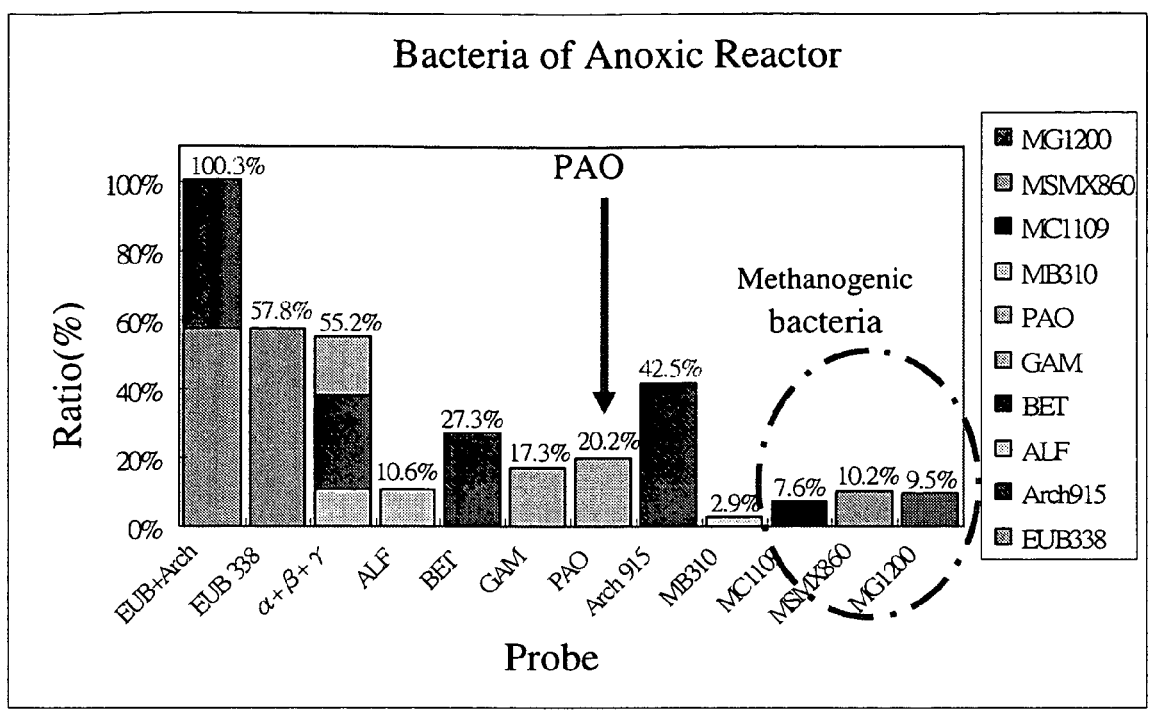
FIG. 12 is the bacteria result of the anoxic reactor, which is analyzed by the molecular biology technology method (Fluorescence in situ Hybridization, FISH) in the example 2.
Figure 13:
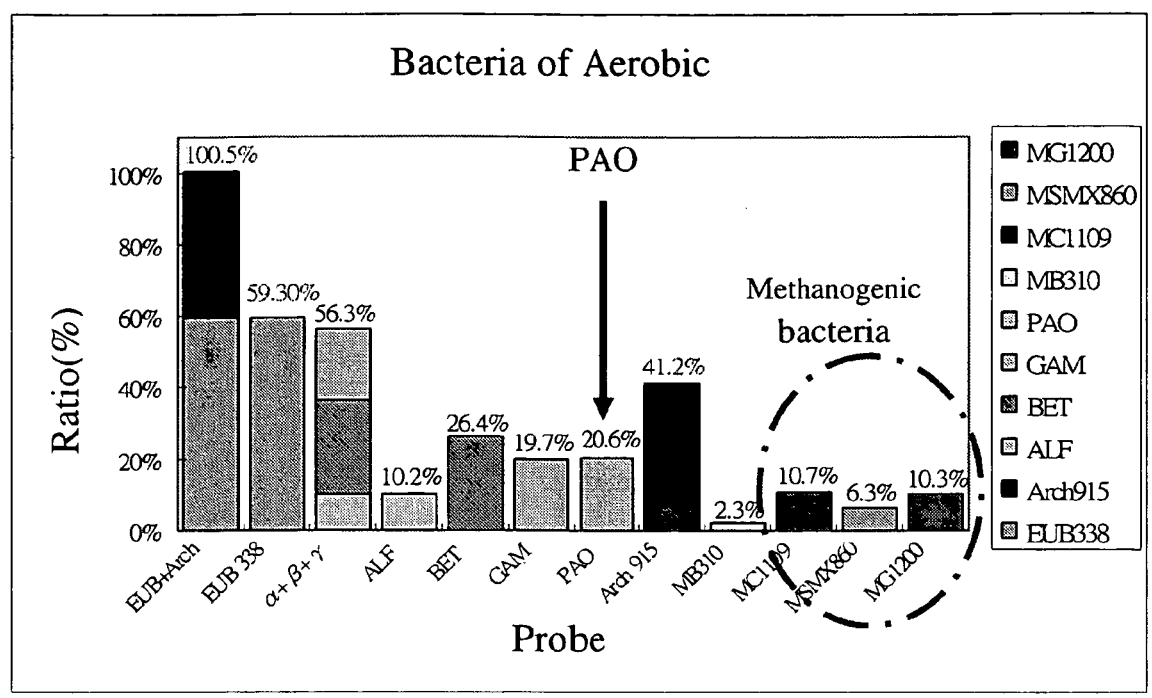
FIG. 13 is the bacteria result of the aerobic reactor, which is analyzed by the molecular biology technology method (Fluorescence in situ Hybridization, FISH) in the example 2.

The present example applies the molecular biology technology such as fluorescence in situ hybridization, FISH method in the same time, which used with different probes for detecting the bacteria results of multi-functional reactor, anoxic reactor and aerobic reactor, wherein that the PAO probe is able to examine the PAO in the reactor, probe MC1109, MSMX860 and MG1200 is capable of examining the methanogenic bacteria in the reactor. The examining result is shown in FIGS. 11, 12 and 13, the ratio of PAO in the system of multi-functional reactor, anoxic reactor and aerobic reactor are 19.1%, 20.2% and 20.6%, respectively. The result shows that the PAO do exist and comprises with the same ratio in the three reactor in the system, and in the aspect of methanogenic bacteria, the probe MC1109, MSMX860 and MG1200 in the multi-functional reactor are detected with the ratio of 11.7%, 9.2% and 14.7%; in the anaerobic reactor are 7.6%, 10.2% and 9.5%; in the aerobic reactor are 10.7%, 6.3% and 10.3%. The result shows that the multi-functional reactor comprises granular methanogenic bacteria, therefore, the existing ratio of the methanogenic bacteria is higher than another 2 reactors. After examining by the molecular biology technology, it is able to understand that the system of the present invention do comprises the microorganism and comprises specific treating effect to the specific pollutants (carbon and phosphorous).

COMPARISON EXAMPLE

The Comparison of the Needed Reactor Volume of the System of the Present Invention and the Traditional $A_2O$ System The present comparison compares the used volume of the present invention and the traditional $A_2O$ system, first, assuming it's under the situation of comprising under different organic loading, the burden of the phosphate and the nitrate is maintained at 20 and 40 kg, and also assuming the volume of multi-functional reactor is 5 kg $COD/m^3$-day (medium low efficiency), the volume of the aerating reactor is 1.5 kg $COD/m^3$-day (high efficiency). To assume the volume of the denitrifying reactor and the membrane reactor is the same in both in the present invention and the traditional membrane-$A_2O$ system, ignore the volume of the anaerobic reactor of the traditional membrane-$A_2O$ system.

Figure 10:
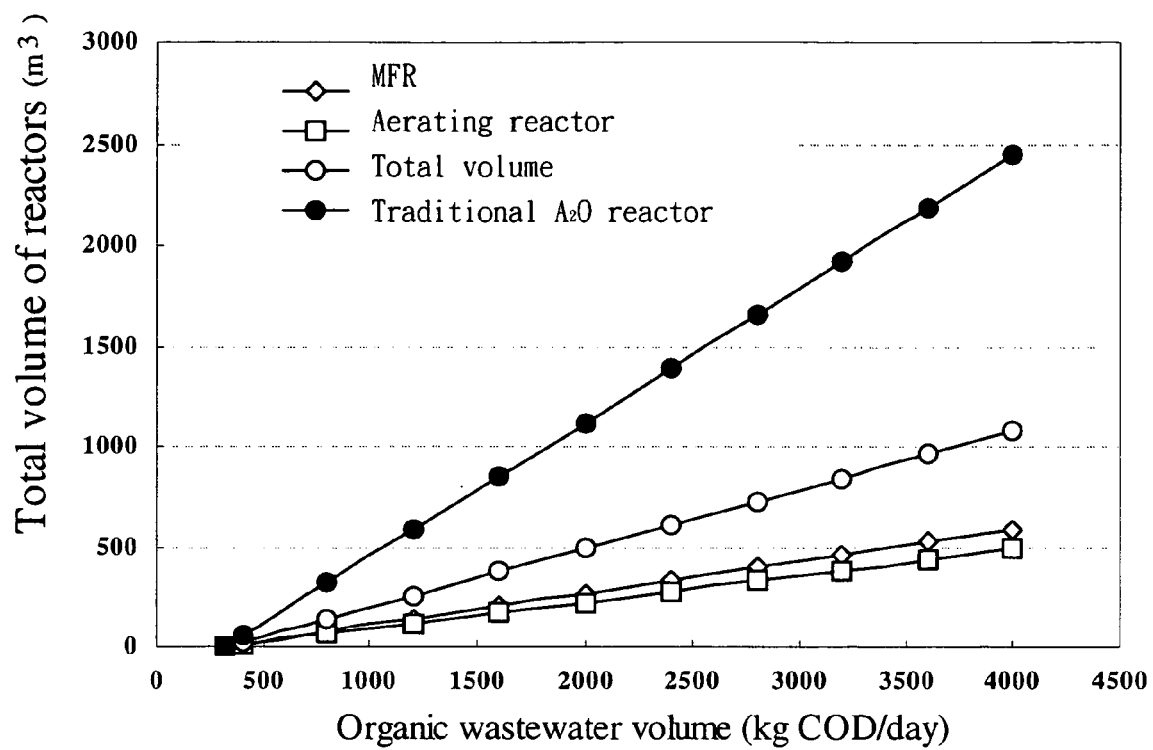
FIG. 10 is the volume comparison of the total volume of the present invention and the traditional membrane—$A_2O$ aerating reactor.

The comparison of the volume of the present invention and the traditional $A_2O$ system is shown as FIG. 10, the reactor total volume of the present invention (hollow cycle) is the sum of multi-functional reactor and the aerating reactor, compare to the volume (real circle) of the traditional membrane-$A_2O$ system, when the organic wastewater is 2000 kg $COD/m^3$-day, the total volume of the reactor of the present invention is 500 $m^3$ and 1200 $m^3$ of the traditional reactor, and when the organic wastewater is 4000 kg $COD/m^3$-day, the total volume of the reactor of the present invention id about 1100 $m^3$ and the volume of traditional reactor is about 2500 $m^3$, which shows that the total volume of the multi-functional reactor and the aerating reactor of the present invention are much smaller than volume of the aerating reactor of the traditional reactor.

Compare the present invention with Taiwan application number 92132719, the differences are as follow: first, the purpose are different: the present invention is applied for the organic wastewater comprises with carbon, nitrogen and phosphorous, the multi-functional reactor (first anaerobic reactor) comprises methanogenic bacteria, PAO and denitrifying bacteria for metabolizing in the same time, the biogas is $CH_4$, $N_2$ and $CO_2$, the main functional bacteria of the later anaerobic bacteria (TW92132719) merely comprises methanogenic bacteria, which is mainly used for removing the carbon the in the water, therefore, the main biogas of the anaerobic is $CH_4$ and $CO_2$. Second, compare the present invention with prior art, the present invention increase an anoxic reactor for denitrifying, which is able to improve he treating effect of the nitrate ion of the whole wastewater treating system to achieve the purpose of removing the nitrogen in the organic wastewater of the present invention. Third, the aerobic reactor of the present invention comprises with PAO, denitrifying bacteria and aerobic heterotrophic bacteria, it is able to process phosphorous removal, nitrifying and carbon removing in the same time, and the main bacteria of the aerobic reactor is only heterotrophic bacteria, therefore, the wastewater treating system of the present invention is different form the prior art.

Therefore, the water treatment system for removing pollutants of carbon, nitrogen, phosphorous of the present invention applies the multi-functional reactor of add methanogenic bacteria for processing the methylation. It is able to lower the carbon volume in the water before the aerobic reactor reacting for making the aerobic reactor is capable of being the location of ammonia nitrogen nitrifying in order to decrease the power consuming and the volume the residual sludge.

OTHER EMBODIMENTS

The preferred embodiments of the present invention have been disclosed in the examples. All modifications and alterations without departing from the spirits of the invention and appended claims, including the other embodiments shall remain within the protected scope and claims of the invention.

Although the preferred embodiments of the present invention have been disclosed in the examples, however the examples should not be construed as a limitation on the actual applicable scope of the invention, and as such, all modifications and alterations without departing from the spirits of the invention and appended claims, including the other embodiments shall remain within the protected scope and claims of the invention.

What is claimed is:

1. A wastewater treating system for removing pollutants of carbon, nitrogen, phosphorous, comprising:
   a first reactor, which contains methanogenic bacteria, PAO and denitrifying bacteria for reactions of eliminating organic carbon in denitrification by denitrifying bacteria, adsorbing partial organic carbon and releasing phosphate by PAO and; metabolizing organic carbon to form methane gas by methanogenic bacteria;
   a second reactor disposed at the rearward of said first reactor, said second reactor treats an effluent from said first reactor by denitrifying bacteria and PAO, said denitrifying bacteria is able to denitrifying nitrate and the PAO is able to release the phosphate;
   a third reactor disposed rearward of said second reactor, which comprises PAO, heterotrophic bacteria and nitrifying bacteria, wherein said PAO is applied for phosphorous accumulation process, said heterotrophic bacteria is applied for carbon removal process, said nitrifying bacteria is applied for nitrifying process; and
   a membrane separation reactor disposed inside said third reactor or the rearward of said third reactor in order to separate a plurality of microorganisms and treated effluent.

2. The system of claim 1, wherein said first reactor is sludge bed-type.

3. The system of claim 1, wherein said second reactor is complete mixing-type.

4. The system of claim 1, wherein said third reactor is complete mixing-type.

5. The system of claim 1, wherein said membrane is capable of washing by gas.

6. The system of claim 5, wherein said gas comprises biogas or air.

7. The system of claim 6, wherein said biogas comprises nitrogen, methane, carbon dioxide and hydrogen.

8. The system of claim 6, which washing membrane with said biogas is able to lower the pH value to 0.2~1.0 unit for further preventing the causing of scaling.

9. The system of claim 1, when said membrane is mounted in the third reactor, mix solution of the third reactor is capable of recycling to said first reactor and/or said second reactor.

10. The system of claim 1, when said membrane is disposed the rearward of the third reactor, it is capable of providing a fourth reactor for mounting said membrane.

11. The system of claim 10, wherein mix solution of said fourth reactor is capable of recycling to said first reactor and/or said second reactor, said mix solution of said third reactor is capable of recycling to said second reactor.

12. The system of claim 1, wherein when said denitrifying bacteria of said first reactor comprises insufficient organic carbon volume in the process of denitrification, it is able to conduct raw wastewater directly into said second reactor.

13. A method, which applies with water treating system of claim 1 for removing pollutants of carbon, nitrogen, phosphorous comprising the steps as follow:
   (a) conducting the wastewater into the first reactor for making the methanogenic bacteria processing a organic compound methylation, the denitrifying bacteria for decomposing the organic pollutants and nitrate nitrogen, in the meantime, the function of Phosphate Accumulating Organism is to attach the organic compound for processing phosphorus releasing;
   (b) conducting the effluent of said first reactor into the second reactor, making the denitrifying bacteria and PAO to treat the effluent of the first reactor, the function of said denitrifying bacteria is to denitrify the nitrate and the function of PAO is to attach the organic compound for releasing phosphate;
   (c) conducting the effluent of said second water into the third reactor, said third reactor includes PAO, heterotrophic bacteria and nitrifying bacteria, wherein said PAO is applied for phosphorous accumulation process, said heterotrophic bacteria is applied for carbon removal process, said nitrifying bacteria is applied for nitrifying process nitrifying bacteria; and
   (d) conducting the effluent of said third reactor into a membrane reactor, separate various microorganisms and the treated effluent by said membrane, in the meantime, achieving the purpose of removing the phosphoric microorganism by the sludge wasting mechanism.

14. The method of claim 13, when said membrane is mounted in the third reactor, mix solution of the third reactor is capable of recycling to said first reactor and/or said second reactor.

15. The method of claim 13, when said membrane is disposed the rearward of the third reactor, it is capable of providing a fourth reactor for mounting said membrane.

16. The method of claim 15, wherein a mix solution of said fourth reactor is capable of recycling to said first reactor and/or said second reactor, said mix solution of said third reactor is capable of recycling to said second reactor.

17. The method of claim 13, wherein when said denitrifying bacteria of said second reactor comprises insufficient organic carbon volume in the process of denitrification, it is able to conduct original waste water directly into said second reactor.

* * * * *